US008812176B1

(12) United States Patent
Biffle et al.

(10) Patent No.: US 8,812,176 B1
(45) Date of Patent: Aug. 19, 2014

(54) COLLAPSIBLE ENVELOPE FOR DESCENT OF BALLOON WITH ENVELOPE STILL ATTACHED

(71) Applicant: Google Inc., Mountain View, CA (US)

(72) Inventors: Clifford Biffle, Berkeley, CA (US); Richard Wayne DeVaul, Mountain View, CA (US); Joshua Weaver, San Jose, CA (US); Anton Valdemar Staaf, San Jose, CA (US); Eric Teller, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/732,001

(22) Filed: Dec. 31, 2012

(51) Int. Cl.
  *G05D 1/00* (2006.01)
  *B64B 1/62* (2006.01)
  *B64C 13/18* (2006.01)

(52) U.S. Cl.
  USPC .................................. 701/2; 244/99; 244/175

(58) Field of Classification Search
  USPC ........................................ 701/2; 244/99, 175
  See application file for complete search history.

(56) References Cited

U.S. PATENT DOCUMENTS

| | | | |
|---|---|---|---|
| 1,390,745 A | 9/1921 | Armstrong | |
| 2,790,479 A | 4/1957 | Mastenbrook | |
| 2,931,597 A | 4/1960 | Moore, Jr. | |
| 3,047,259 A | 7/1962 | Tatnall et al. | |
| 3,119,578 A | 1/1964 | Borgeson et al. | |
| 3,390,853 A | 7/1968 | Wykes | |
| 3,433,435 A | 3/1969 | Alai | |
| 3,452,949 A | 7/1969 | Maloney et al. | |
| 3,614,031 A | 10/1971 | Demboski | |
| 3,807,384 A | 4/1974 | Schach et al. | |
| 4,042,192 A * | 8/1977 | Walter ............................ 244/99 |
| 4,113,206 A | 9/1978 | Wheeler | |
| 4,215,834 A | 8/1980 | Dunlap | |
| 4,262,864 A | 4/1981 | Eshoo | |
| 4,366,936 A | 1/1983 | Ferguson | |

(Continued)

FOREIGN PATENT DOCUMENTS

| WO | 2011/160172 | 12/2011 |
|---|---|---|
| WO | 2012/025769 | 3/2012 |

OTHER PUBLICATIONS

Joachim Horwath et al., "Broadband Backhaul Communication for Stratospheric Platforms: The Stratospheric Optical Payload Experiment (STROPEX)," Society of Photo-Optical Instrumentation Engineers (SPIE), 2006, vol. 6304 (12 pages).

(Continued)

*Primary Examiner* — Thomas Black
*Assistant Examiner* — Tyler Paige
(74) *Attorney, Agent, or Firm* — McDonnell Boehnen Hulbert & Berghoff LLP

(57) ABSTRACT

A balloon is provided having a balloon envelope having a top portion and a bottom portion, a payload positioned beneath the balloon envelope, a moveable plate positioned atop the balloon envelope, a line attached to the moveable plate, and a control system configured to cause the line to be pulled to cause the moveable plate to be pulled towards the bottom portion of the balloon envelope such that the top portion of the balloon envelope is moved towards the bottom portion of the balloon envelope forcing gas out of the balloon envelope such that the balloon envelope is collapsed. The balloon may further include a drag plate positioned beneath the balloon envelope that serves to slow the descent of the payload to the earth.

27 Claims, 8 Drawing Sheets

(56) References Cited

U.S. PATENT DOCUMENTS

| | | | |
|---|---|---|---|
| 4,651,956 A * | 3/1987 | Winker et al. | 244/99 |
| 4,836,471 A * | 6/1989 | Piccard | 244/99 |
| 5,645,248 A | 7/1997 | Campbell | |
| 6,119,979 A | 9/2000 | Lee et al. | |
| 6,324,398 B1 | 11/2001 | Lanzerotti et al. | |
| 6,607,166 B1 | 8/2003 | Pichkhadze et al. | |
| 6,628,941 B2 | 9/2003 | Knoblach et al. | |
| 6,830,222 B1 | 12/2004 | Nock et al. | |
| 7,046,934 B2 | 5/2006 | Badesha et al. | |
| 7,341,223 B2 | 3/2008 | Chu | |
| 7,356,390 B2 | 4/2008 | Knoblach et al. | |
| 7,568,656 B2 | 8/2009 | Handley | |
| 7,913,948 B2 | 3/2011 | Porter | |
| 7,948,426 B2 | 5/2011 | Pevler et al. | |
| 8,061,648 B2 | 11/2011 | Lachenmeier | |
| 8,596,571 B2 * | 12/2013 | Goelet | 244/30 |
| 2004/0065773 A1 | 4/2004 | Morales | |
| 2005/0224639 A1 * | 10/2005 | Kavanagh | 244/31 |
| 2006/0000945 A1 | 1/2006 | Voss | |
| 2010/0039984 A1 | 2/2010 | Brownrigg | |
| 2013/0043353 A1 * | 2/2013 | Balaskovic | 244/175 |
| 2013/0175387 A1 * | 7/2013 | DeVaul et al. | 244/31 |

OTHER PUBLICATIONS

Dirk Giggenbach et al., "Optical Free-Space Communications Downlinks from Stratospheric Platforms—Overview on STROPEX, the Optical Communications Experiment of CAPANINA," 14th IST Mobile & Wireless Communications Summit, Jun. 2005, No. 483, Dresden, Germany (4 pages).

Anthony S. Acampora et al., "A Broadband Wireless Access Network Based on Mesh-Connected Free-Space Optical Links," IEEE Personal Communications, Oct. 1999, 1070-9916/99, pp. 62-65.

J. Thornton et al., "Broadband communications from a high-altitude platform: the European HeliNet programme," Electronics & Communication Engineering Journal, Jun. 2001, pp. 138-144.

Jayasri Akella et al., "Building Blocks for Mobile Free-Space-Optical Networks," IEEE, 2005, 0-7803-9019-9/05 (5 pages).

D. Grace et al., "CAPANINA—Communications from Aerial Platform Networks Delivering Broadband Information for All," 14th IST Mobile & Wireless Communications Summit, Jun. 2005, No. 252, Dresden, Germany (5 pages).

Mihael Mohorcic et al., "Evaluation of Wavelength Requirements for Stratospheric Optical Transport Networks," Journal of Communications, Sep. 2009, vol. 4, No. 8, pp. 588-596.

Carolina Fortuna et al., "HAP based optical transport network design," Proceedings of the 15th International Electrotechnical and Computer Science Conference (ERK) Sep. 2006 (4 pages).

Alejandro Aragon-Zavala et al., High-Altitude Platforms for Wireless Communications, John Wiley & Sons, Ltd., 2008, pp. C1-C80.

Alejandro Aragon-Zavala et al., High-Altitude Platforms for Wireless Communications, John Wiley & Sons, Ltd., 2008, pp. 81-158.

Alejandro Aragon-Zavala et al., High-Altitude Platforms for Wireless Communications, John Wiley & Sons, Ltd., 2008, pp. 159-241.

A. Biswas et al., "Deep Space Optical Communications Link Availability and Data Volume," Free-Space Laser Communication Technologies XVI, San Jose, CA, Jan. 2004 (9 pages).

D. Giggenbach et al., "Optical Data Downlinks from Earth Observation Platforms," Proceedings of the SPIE, 2009, vol. 7199 (14 pages).

David Grace et al., "Integrating Users into the Wider Broadband Network via High Altitude Platforms," IEEE Wireless Communications, 1536-1286/05, Oct. 2005, pp. 98-105.

Jayasri Akella et al., "Multi-channel Communication in Free-Space Optical Networks for the Last-mile," available online at: http://networks.ecse.rpi.edu/~sri/papers/Array-lanman07.pdf (last visited Jan. 18, 2012).

Alan E. Willner et al., "Physical Layer Routing in Free-Space Optical Networks, LEOS," available online at: http://photonicssociety.org/newsletters/oct05/physical_layer.html (last visited Jan. 18, 2012).

Justin Mullins, "NASA Develops 'Smart' Weather Balloons for Launch Sites," NewScientist, May 23, 2007.

James Hutchinson, Mobile Mesh Network Finds Interest in NGOs, Australian Red Cross enthusiastic about options presented by mesh telephony, available online at: http://www.computerworld.com.au/article/374682/mobile_mesh_network_finds_interest_ngos/ (last visited Jan. 17, 2012).

Dung Dinh Luong, et al., Network Architecture and Protocols, CAPANINA, Oct. 16, 2006, pp. 1-83.

Dung Dinh Luong, et al., Network Architecture and Protocols, CAPANINA, Oct. 16, 2006, pp. 84-172.

In Keun Son, Design and Optimization of Free Space Optical Networks, Auburn University, Dec. 13, 2010, pp. 1-78, Auburn, Alabama.

In Keun Son, Design and Optimization of Free Space Optical Networks, Auburn University, Dec. 13, 2010, pp. 79-147, Auburn, Alabama.

Hui Zang, et al., A Review of Routing and Wavelength Assignment Approaches for Wavelength-Routed Optical WDM Networks, Optical Networks Magazine, Jan. 2000, pp. 47-60.

Scott Bloom, et al., "The Last-Mile Solution: Hybrid FSO Radio," AirFiber, Inc., May 2002, pp. 1-20.

Di Wang, et al., "Throughput Capacity of Hybrid Radio-Frequency and Free-Space-Optical (RF/FSO) Multi-Hop Networks," Department of Electrical, Computer and Systems Engineering, Rensselaer Polytechnic Institute, pp. 1-8.

Mohammed N. Smadi, et al., "Free-Space Optical Gateway Placement in Hybrid Wireless Mesh Networks," Journal of Lightwave Technology, Jul. 15, 2009, vol. 27, No. 14, pp. 2688-2697.

Roy Eddleston, et al., Mesh Networking Soars to New Heights, available online at: http://www.airballooningevent.com/mesh-networking-soars-to-new-heights (last visited Jan. 18, 2012) (Feb. 19, 2005).

Barry William Walsh, Balloon Network Test Successful, available online at: http://17.taylor.edu/community/news/news_detail.shtml?inode=14221 (last visited Jan. 18, 2012) Nov. 5, 2007.

T.C. Tozer et al., High-altitude platforms for wireless communications, Electronics & Communication Engineering Journal, Jun. 2001, 127-137.

G. Ellinas, et al., Network Control and Management Challenges in Opaque Networks Utilizing Transparent Optical Switches, available online at: http://www.jaywalkertc.com/publications/JAW_live_papers/IEEE_Opt_Comm.pdf (last visited Jan. 18, 2012), pp. 1-19.

Asuman E. Ozdaglar, et al., Routing and Wavelength Assignment in Optical Networks, available online at: http://web.mit.edu/asuman/www/documents/RWA_Paper.pdf (last visited Jan. 18, 2012), pp. 1-25.

David Grace et al., Broadband Communications via High Altitude Platforms, John Wiley & Sons, Ltd., 2011, pp. 49-73.

David Grace et al., Broadband Communications via High Altitude Platforms, John Wiley & Sons, Ltd., 2011, pp. 75-113.

David Grace et al., Broadband Communications via High Altitude Platforms, John Wiley & Sons, Ltd., 2011, pp. 219-238.

Balaram et al., "Autonomous Mobility, Navigation and Control for Venus Aerobots," International Symposium on Artificial Intelligence, Optics and Automation in Space, Jul. 14, 1997, Tokyo, Japan, pp. 1-7.

Andrew S. Carten Jr., An Investigation of the Applicability of High Altitude, Lighter-Than-Air (LTA) Vehicles to the Tactical Communications Relay Problem, Air Force Cambridge Research Labs, Hanscom Air Force Base, Aug. 20, 1974, Massachusetts, pp. 1-62.

Michael Corbett et al., High Altitude Balloon Project, Wright State University, Engineering Design, Mar. 11, 2006, Dayton, Ohio, pp. 1-76.

* cited by examiner

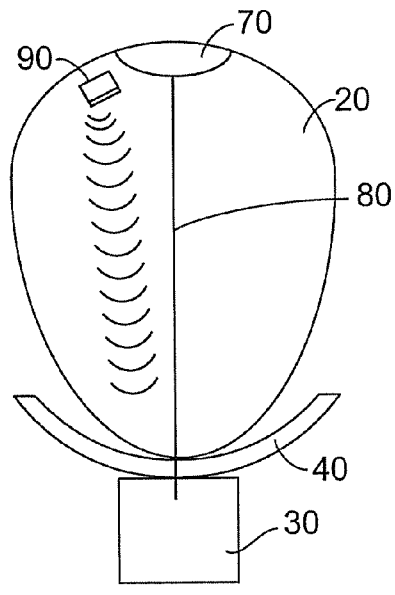
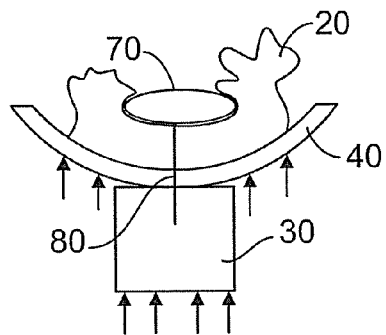
FIG. 5A                FIG. 5B
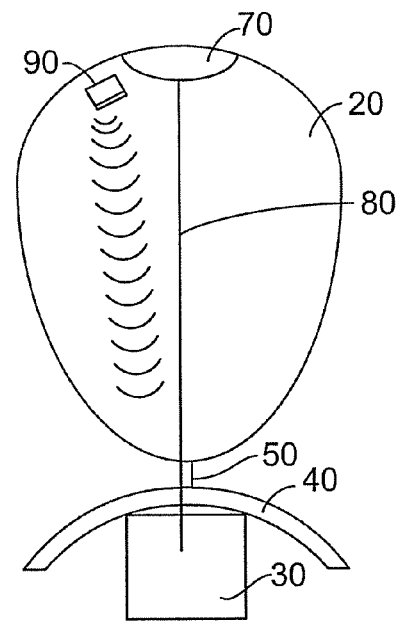
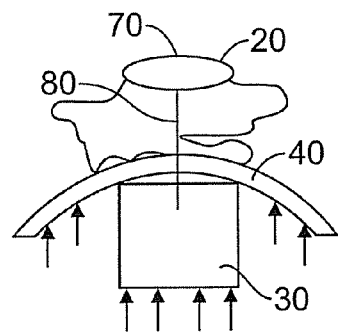
FIG. 6A                FIG. 6B

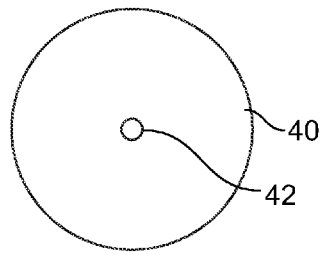
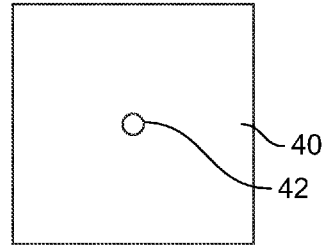
FIG. 9A  FIG. 9B
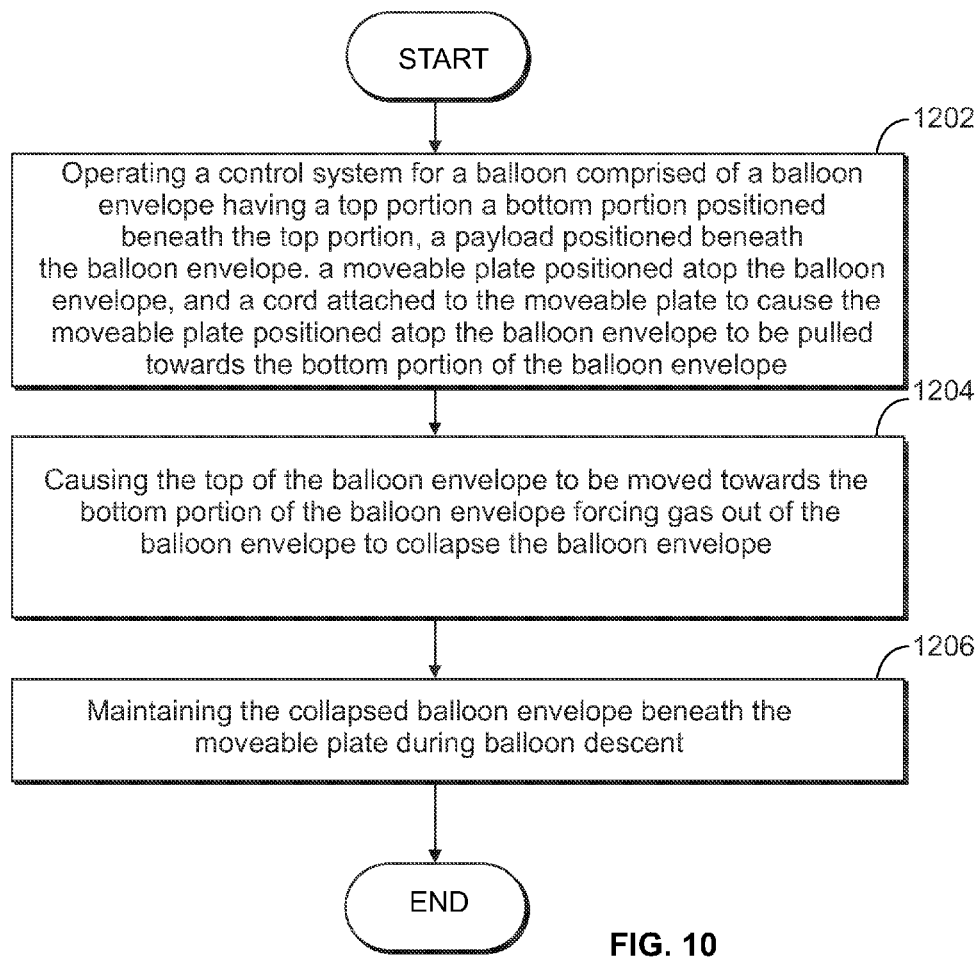
FIG. 10

COLLAPSIBLE ENVELOPE FOR DESCENT OF BALLOON WITH ENVELOPE STILL ATTACHED

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a balloon is provided having a balloon envelope having a top portion and a bottom portion positioned beneath the top portion, a payload positioned beneath the balloon envelope, a moveable plate positioned atop the balloon envelope, a line attached to the moveable plate, and a control system configured to cause the line to be pulled to cause the moveable plate to be pulled towards the bottom portion of the balloon envelope such that the top portion of the balloon envelope is moved towards the bottom portion of the balloon envelope forcing gas out of the balloon envelope such that the balloon envelope is collapsed. The balloon may further include a drag plate positioned beneath the balloon envelope that serves to slow the descent of the payload to the earth.

In another aspect, a computer-implemented method is provided, comprising the steps of operating a control system for a balloon comprised of a balloon envelope having a top portion and a bottom portion positioned beneath the top portion, a payload positioned beneath the balloon envelope, a moveable plate positioned atop the balloon envelope, and a line attached to the moveable plate to cause the moveable plate positioned atop the balloon envelope to be pulled towards the bottom portion of the balloon envelope, causing the top of the balloon envelope to be moved towards the bottom portion of the balloon envelope forcing gas out of the balloon envelope to collapse the balloon envelope, and maintaining the collapsed balloon envelope beneath the moveable plate during balloon descent. The method may further include the step of pulling the line through a drag plate towards the payload to cause the balloon envelope to be collapsed between the moveable plate and the drag plate.

In another aspect, a non-transitory computer readable medium has stored therein instructions that are executable by a computing device to cause the computing device to perform functions comprising operating a control system for a balloon comprised of a balloon envelope having a top portion and a bottom portion positioned beneath the top portion, a payload positioned beneath the balloon envelope, a moveable plate positioned atop the balloon envelope, and a line attached to the moveable plate to cause the moveable plate positioned atop the balloon envelope to be pulled towards the bottom portion of the balloon envelope, causing the top portion of the balloon envelope to be moved towards the bottom portion of the balloon envelope forcing gas out of the balloon envelope to collapse the balloon envelope, and maintaining the collapsed balloon envelope beneath the moveable plate during balloon descent. The instructions may further include the function of pulling the line through a drag plate towards the payload to cause the balloon envelope to be collapsed between the moveable plate and the drag plate These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 5A shows an expanded balloon positioned above payload with a concave drag plate positioned therebetween, and a moveable plate atop the balloon envelope connected with a line to the payload, according to an example embodiment.

FIG. 5B shows the balloon of FIG. 5A, where the moveable plate has been moved towards the drag plate to collapse the balloon envelope, where drag forces are acting upon the payload and drag plate upon descent of the balloon, according to an example embodiment.

FIG. 6A shows an expanded balloon positioned above payload with an inverted concave drag plate positioned therebetween, and a moveable plate atop the balloon envelope connected with a line to the payload, according to an example embodiment.

FIG. 6B shows the balloon of FIG. 6A, where the moveable plate has been moved towards the drag plate to collapse the balloon envelope, where drag forces are acting upon the payload and drag plate upon descent of the balloon, according to an example embodiment.

FIG. 9A shows a top view of drag plate 40 shown in FIGS. 5-7, with an aperture so that a line may be pulled through the drag plate to pull the moveable plate towards the payload to collapse the balloon envelope.

FIG. 9B shows a top view of an alternate geometry of drag plate 40 shown in FIGS. 5-7, with an aperture so that a line may be pulled through the drag plate to pull the moveable plate towards the payload to collapse the balloon envelope.

FIG. 10 is a method, according to an example embodiment.

DETAILED DESCRIPTION

Figure 1:
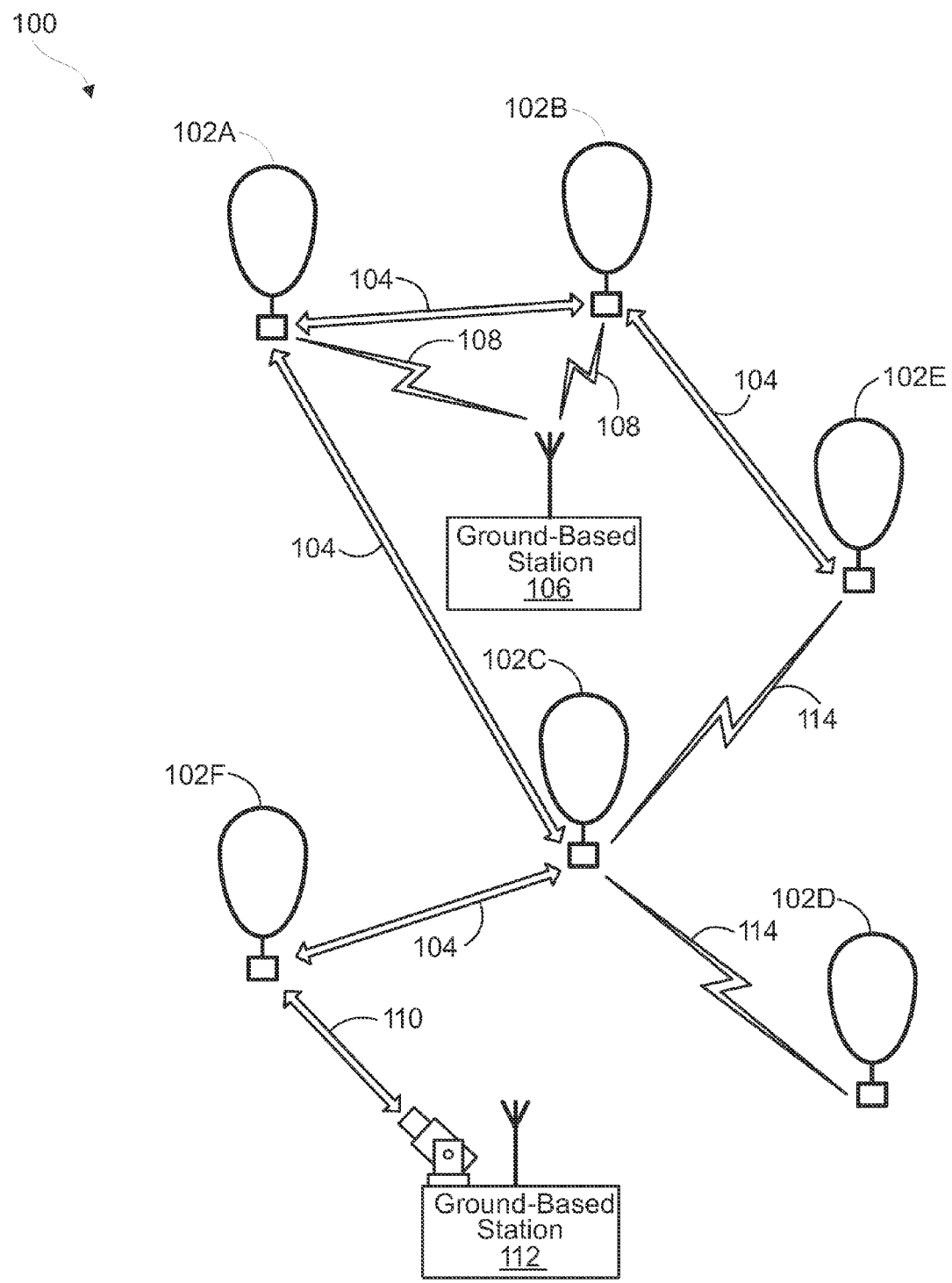
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

Instruments and electronic equipment may be positioned within a payload of a balloon that may be kept aloft in the upper atmosphere. The instruments or electronic devices may be used to record various data and information. After a period of time, it may be desirable to have the payload return to the surface of the earth to retrieve the information obtained from the instruments and electronic devices positioned in the payload. There may be other, perhaps more important, reasons, to bring the payload down to the earth's surface. For example, the balloon payload may be brought down to provide necessary upgrades to the electronic equipment within the payload. Or, the payload may be brought down to prevent the payload from entering into unauthorized air space.

The balloon envelope may be deflated or collapsed, or disconnected from the payload, to allow the payload to descend to the surface of the earth. For example, the balloon envelope may be caused to rip, opening a hole in the envelope to deflate the balloon, and allow the payload to return to the return. However, ripping the envelope may not be sufficiently effective to cause the balloon to deflate as the ripped portion may rotate to the bottom of the balloon, and enough lifting gas may remain in the balloon envelope to keep the payload aloft. In such instances, control of the balloon may be lost, resulting in the loss of the balloon payload. Furthermore, even if the balloon is eventually successfully deflated, the payload may not return to the earth's surface at the desired time or location.

Furthermore, an uncontrolled or drifting balloon may cause a nuisance or danger to air traffic. Moreover, when the balloon eventually returns to earth it may cause pollution as the balloon components are strewn across an eventual landing site. A perhaps more significant problem may arise if the payload is unable to be recovered from the uncontrolled balloon. There could be an undesirable loss of expensive equipment within the payload, as well as the loss of important and potentially sensitive information obtained by the balloon during flight.

Another known method of retrieving a balloon payload employs a tether that attaches the payload to the balloon envelope. When it is desired to have the payload return to the earth's surface, the tether may be severed, using mechanical or electromagnetic cut-down systems, for example. Once the payload is severed from the balloon envelope, the payload is allowed to descend to the earth. However, this manner of retrieving a balloon payload is undesirable because the balloon envelope is not recovered and allowed to drift uncontrolled in the atmosphere. As noted above, an uncontrolled or drifting balloon may cause a nuisance or danger to air traffic, cause pollution, or result in the loss of the payload and the instruments and equipment therein.

It may be desirable to provide a balloon equipped with means to ensure that, when it is desired to have the balloon payload return to the earth's surface, the balloon envelope is reliably collapsed to allow the payload to return to the earth's surface at a desired time and location. It may also be desirable to provide a balloon where the collapsed balloon envelope remains with the payload when the payload returns to earth so that the balloon envelope is not left to uncontrollably drift through the atmosphere and cause the problems noted above. It may also be desirable to slow the rate of descent of the payload to the earth so that the instruments or electronic devices are not damaged upon impact, and so that the data and information that has been obtained may be retrieved, as well as to reduce the risk of injury to people or property beneath payload.

Example embodiments may be directed to a balloon having a balloon envelope with a top portion and a bottom portion positioned beneath the top portion, a payload positioned beneath the balloon envelope, a moveable plate positioned atop the balloon envelope, a line attached to the moveable plate, and a control system configured to cause the line to be pulled to cause the moveable plate to be pulled towards the bottom portion of the balloon envelope such that the top portion of the balloon envelope is moved towards the bottom portion of the balloon envelope forcing gas out of the balloon envelope to collapse the balloon envelope. The line could have a wide range of embodiments suitable for connecting the moveable plate to the drag plate or payload. For example, the line could be a non-rigid cord, a chain, a rope, a tether, cable, wire, or thread as an example.

With this embodiment, the collapsed balloon envelope remains positioned between the moveable plate and the payload during balloon descent. In some embodiments, the moveable plate may be held in place or released by an actuator positioned on the balloon envelope. The actuator may be controlled wirelessly via a control system that is located in the envelope itself or located in or near the payload.

Example embodiments may further include a drag plate attached to the payload that may serve to slow the descent of the payload after the balloon envelope has been deflated. The drag plate may be attached to the payload, either beneath the payload, or above the payload between the payload and the balloon envelope, or may be formed integral with the payload. The drag plate has a surface area that creates a drag force as the payload descends towards the earth. The larger the surface of the drag plate facing the earth, the larger the drag forces that are created slowing the descent of the payload.

An advantage of using a drag plate is that it does not need to be deployed, like a parachute would be, to slow the descent of the payload because the drag plate is already in place. Thus, the use of a drag plate to control the descent of the payload eliminates any issues or risks that may arise when a means for slowing the descent must be deployed, e.g., when using a parachute that must properly deploy.

The drag plate may be a downward facing concave plate where the payload is positioned within at least a portion of the downward facing concave section of the drag plate. The use of a downward facing concave plate may be advantageous because the geometry of the drag plate serves to reduce the amount of air that may be displaced from beneath the drag plate, thus increasing the drag forces that may be used to slow the descent of the payload.

The drag plate could also be an upward facing concave plate that is attached to the balloon envelope (and the payload) such that the balloon envelope is positioned within at least a portion of the upward facing concave section of the drag plate. Of course, the drag plate could also have other geometries, including a flat plate. Viewed from the top, the drag plate may also have a number of different geometries, including square, round, polygonal, etc.

The drag plate may advantageously have a surface area that extends beyond the outer surface of the payload, and may extend as far as the diameter of the balloon envelope when the balloon envelope is inflated. The outer surface of the drag plate may also extend beyond the diameter of the balloon envelope when the balloon envelope is inflated to provide even greater drag resistance to slow the descent of the payload.

The drag plate may be made from a solid material so that air and wind do not pass through the drag plate during descent, although some porosity or air flow through the drag plate may be tolerated, and may serve to stabilize the drag plate during descent. The drag plate may be comprised of a lightweight material, such as a carbon fiber or plastic material, or other composite material that is not too heavy so as to negatively impact achieving or maintaining a desired balloon altitude, prior to the descent of the payload.

Example embodiments may include a drag plate having an aperture, such that a line attached to the moveable plate may be pulled through the aperture in the drag plate towards the payload to cause the balloon envelope to be collapsed between the moveable plate and the drag plate. Thus, the line may be tethered to the moveable plate and extend into the payload. In some embodiments the drag plate may be attached to the bottom portion of the balloon envelope and the payload suspended from the line that passes through the drag plate.

Other example embodiments may be directed to a balloon with a drag plate positioned above the balloon envelope. The drag plate may be attached by a line to a payload that is positioned beneath the balloon envelope. The drag plate may have the same design and serve the same purposes as described above. In addition, as the as the balloon envelope is collapsed, the payload may be suspended from the drag plate as it descends.

The line may optionally be winched towards the payload, or towards the drag plate, wherein the payload and the drag plate are drawn towards one another. The drawing together of the drag plate and the payload may also be used to force gas out of the balloon envelope to collapse the balloon envelope. With these embodiments, the collapsed balloon envelope remains positioned between drag plate and the payload, so that the balloon envelope returns to the earth's surface along with the payload.

2. Example Balloon Networks

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
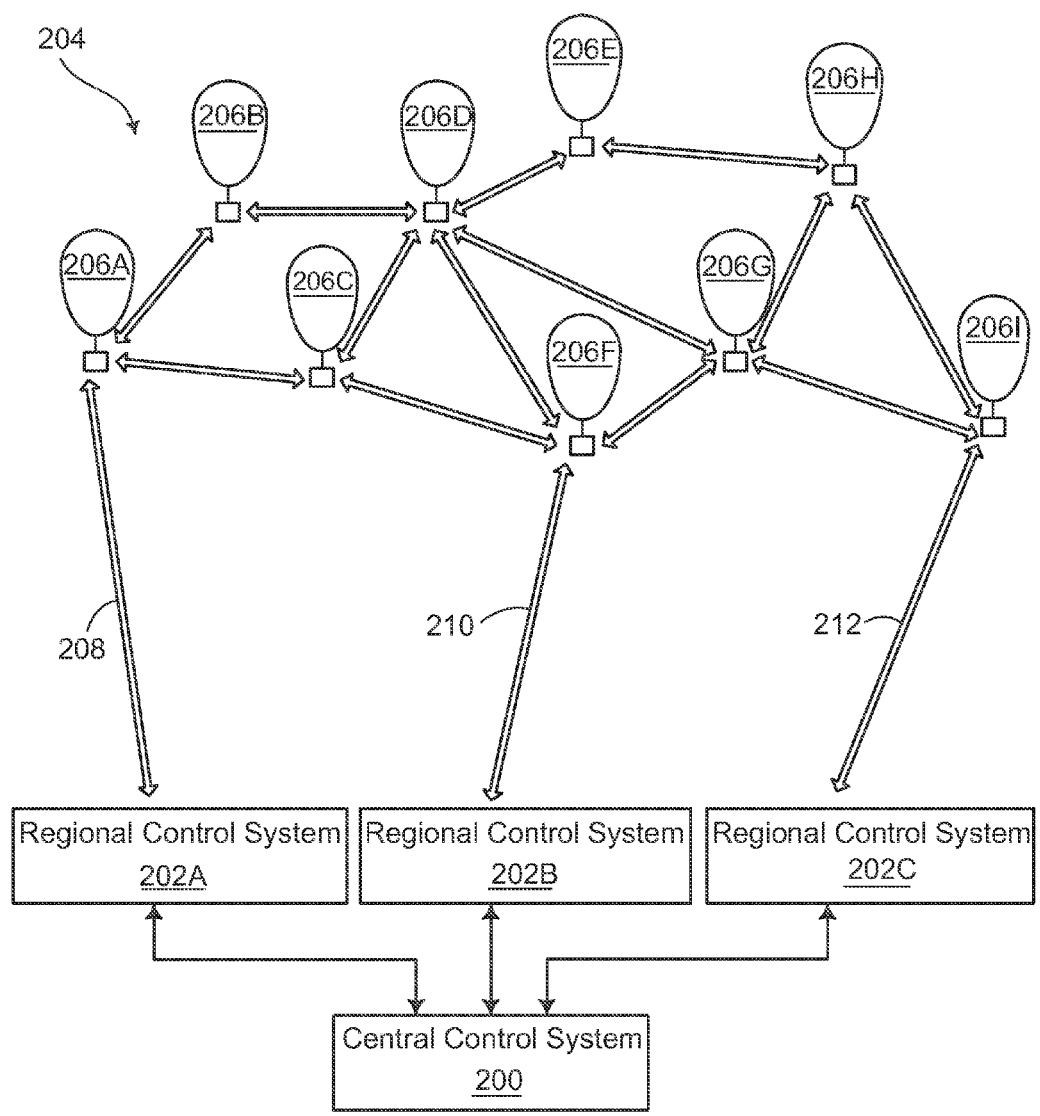
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_i$, for instance.

Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
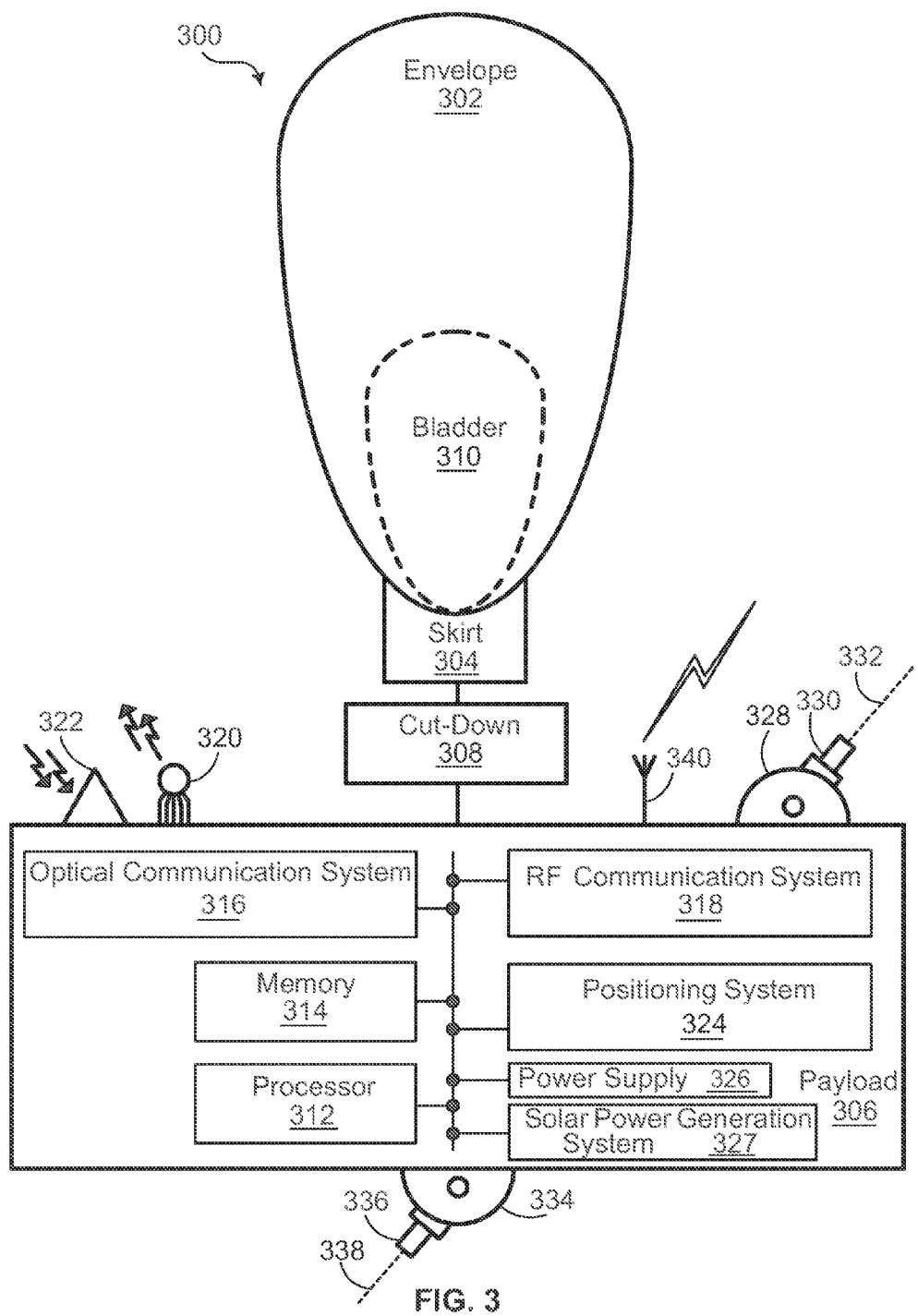
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein. Thus, processor 312, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. Balloon Network with Optical and RF Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
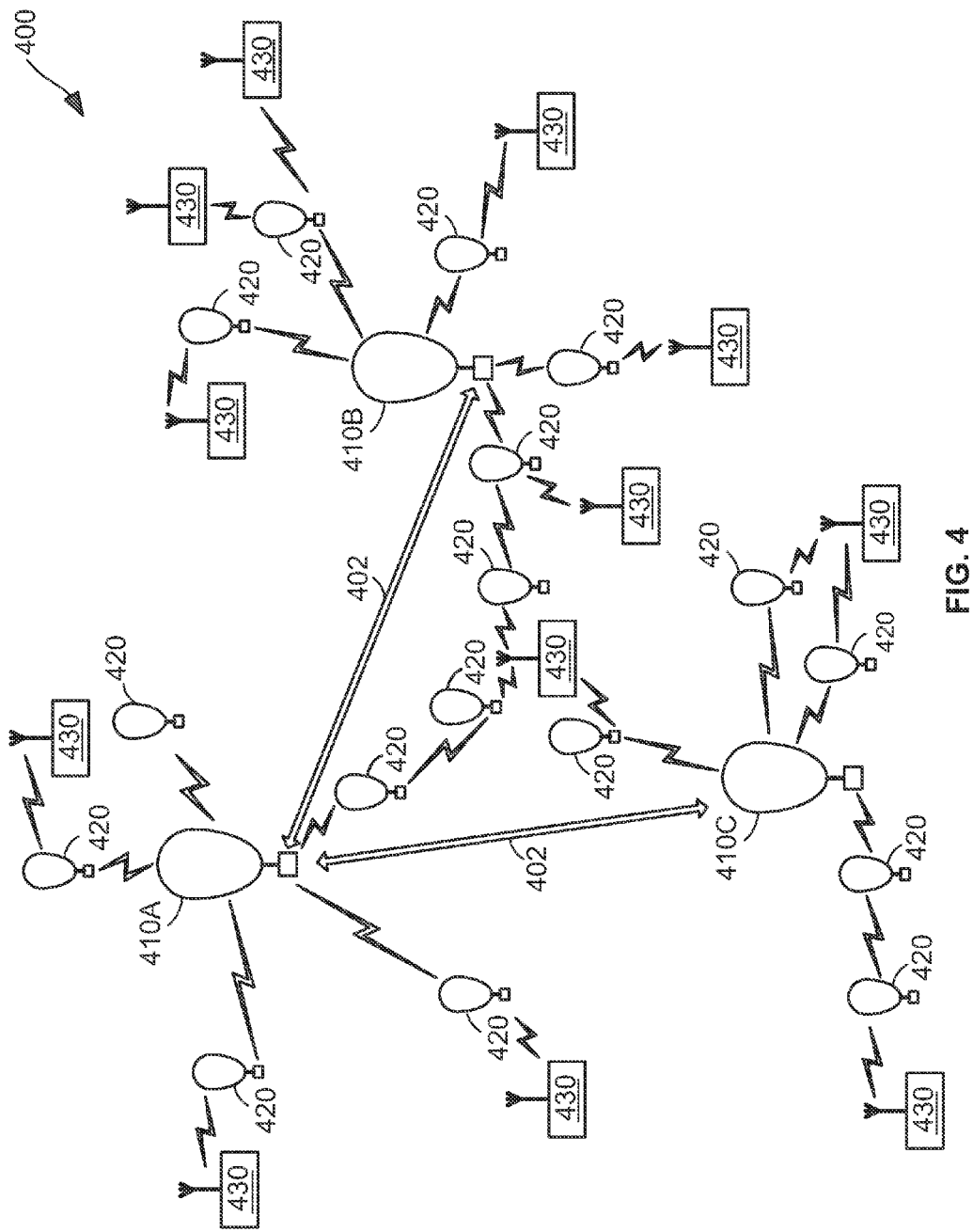
FIG. 4 shows a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 GBit/sec or more.

A larger number of high-altitude balloons may then be configured as sub-nodes, which may communicate with ground-based Internet nodes at data rates on the order of approximately 10 Mbit/sec. For instance, in the illustrated implementation, the sub-nodes 420 may be configured to connect the super-nodes 410 to other networks and/or directly to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

4. Providing a Payload Positioned Beneath a Balloon Envelope, with a Moveable Plate Positioned Atop the Balloon Envelope and a Line Attached to the Moveable Plate that May be Pulled to Force Gas Out of the Balloon Envelope to Collapse the Balloon Envelope.

As noted above, instruments or electronic devices may be positioned within a payload attached to a high atmosphere balloon. The instruments or electronic devices may be used to record various data and information. After a period of time, it may be desirable to have the payload return to the surface of the earth to retrieve the information obtained from the instruments and electronic devices positioned in the payload.

The balloon envelope may be deflated or collapsed, or disconnected from the payload, to allow the payload to descend to the surface of the earth. For example, the balloon envelope may be caused to rip, opening a hole in the envelope to deflate the balloon; or if a cord is used to attach the payload to the balloon envelope, the cord may be severed, using for example mechanical or electromagnetic cut-down devices. Once the balloon is deflated, or the payload is severed from the balloon envelope, the payload is allowed to descend to the earth. However, ripping the envelope may not be sufficiently effective to cause the balloon to deflate as the ripped portion may rotate to the bottom of the balloon, and enough lifting gas may remain in the balloon envelope to keep the payload aloft.

In instances where the balloon envelope is not sufficiently deflated, or is severed from the payload, an uncontrolled or drifting balloon envelope may exist that could cause a nuisance or danger to air traffic, cause pollution, or result in the loss of the payload and the equipment and instruments within the payload.

It may be desirable to provide a balloon equipped with means to ensure that, when it is desired to have the balloon payload return to the earth's surface, the balloon envelope is reliably collapsed to allow the payload to return to the earth's surface at a desired time and location. It may also be desirable to provide a balloon where the collapsed balloon envelope remains with the payload when the payload returns to earth so that the balloon envelope is not left to uncontrollably drift through the atmosphere and cause the problems noted above.

It may also be desirable to slow the rate of descent of the payload to the earth so that the instruments or electronic devices are not damaged upon impact, and so that the data and information that has been obtained may be retrieved, as well as to reduce the risk of injury to people or property beneath payload.

As shown in FIGS. 5-7B, example embodiments may be directed to a balloon having a balloon envelope 20 with a top portion and a bottom portion positioned beneath the top portion, a payload 30 positioned beneath the balloon envelope 20, a moveable plate 70 positioned atop the balloon envelope 20, a line 80 attached to the moveable plate 70, and a control system configured to cause the line 80 to be pulled to cause the moveable plate 70 to be pulled towards the bottom portion of the balloon envelope such that the top portion of the balloon envelope 20 is moved towards the bottom portion of the balloon envelope 20 forcing gas out of the balloon envelope 20 to collapse the balloon envelope 20.

With these embodiments, the collapsed balloon envelope 20 remains positioned between the moveable plate 70 and the payload 30 during balloon descent. In some embodiments, the moveable plate 70 may be held in place or released by an actuator 90 positioned on the balloon envelope 20. The actuator 90 may be controlled wirelessly via a control system that is located in the balloon envelope 20 itself, or located in or near the payload 30.

It may be desirable to slow the rate of descent of the payload to the earth so that the instruments or electronic devices are not damaged upon impact, and so that the data and information that has been obtained may be retrieved. A parachute could be deployed from the payload to slow the rate of descent, although the remote deployment of a parachute may be unreliable. If the parachute fails to deploy, an undesirable, uncontrolled descent of the payload may occur.

Example embodiments may be directed to a balloon having a drag plate attached to the payload that may serve to slow the descent of the payload after the balloon envelope has been deflated. As shown in FIGS. 5A and 5B, a drag plate 40 may be attached to the payload 30, where drag plate 40 is shown positioned above payload 30 and beneath balloon envelope 20. Of course, the drag plate could also be positioned beneath the payload, or may even be formed integral with the payload. In FIGS. 5A and 5B, the drag plate 40 is also shown attached to balloon envelope 20. Alternately, the payload 30 could be tethered to the balloon envelope via a cord, as an example.

FIG. 5B shows balloon envelope 20 after it has been deflated. The drag plate 40 has a surface area that creates a drag force (depicted by the arrows) as the payload 30 descends towards the earth and is forced through the air in the atmosphere. The larger the surface of the drag plate 40 facing the earth, the larger the drag forces that are created slowing the descent of the payload. In this example the drag plate 40 is concave with an upward facing concave surface. In this embodiment, the collapsed balloon envelope 20 is positioned between drag plate 40 and moveable plate 70, so that the balloon envelope 20 returns to the earth's surface along with the payload 30. Because the balloon envelope 20 remains with the payload 30, the problems noted above with an uncontrolled, drifting balloon envelope are avoided.

Furthermore, outer edges of the drag plate 40 may extend beyond the outer surface of the payload 30. Moreover, the outer edges of drag plate 40 may extend as far as the diameter of the balloon envelope 20 when balloon envelope 20 is inflated. The outer surface or outer edges of drag plate 40 may even extend further than the diameter of balloon envelope 20 when balloon envelope 20 is inflated to create even larger drag forces to slow the descent of the payload 30 if desired.

An advantage of using a drag plate is that it does not need to be deployed, like a parachute would, to slow the descent of the payload because the drag plate is already in place. Thus, the use of a drag plate to control the descent of the payload eliminates any issues or risks that may arise when a means for slowing the descent must be deployed, e.g., when using a parachute that must properly deploy.

As shown in FIGS. 6A and 6B, the drag plate 40 may be a downward facing concave plate where the payload 30 is positioned within at least a portion of the downward facing concave section of the drag plate 40. The use of a downward facing concave drag plate may be advantageous because the geometry of the drag plate 40 serves to reduce the amount of air that may be displaced from beneath the drag plate 40 during descent, thus increasing the drag forces that may be used to slow the descent of the payload 30. Drag plate 40 and/or payload 30 may be tethered to balloon envelope via cord 50. Alternatively, the drag plate 40 could be attached to the balloon envelope directly as shown in FIG. 5A.

FIG. 6B shows balloon envelope 20 after it has been deflated. The drag plate 40 has a surface area that creates a drag force (depicted by the arrows) as the payload 30 descends towards the earth and is forced through the air in the atmosphere. The larger the surface of the drag plate 30 facing the earth, the larger the drag forces that are created slowing the descent of the payload. In FIG. 6B, the deflated balloon envelope 20 is shown remaining positioned between drag plate 40 and moveable plate 70. Thus, the balloon envelope 20 remains attached to the payload 30 as the payload 30 returns to the earth's surface, thereby eliminating the problems noted above associated with an uncontrolled, drifting balloon envelope.

Figure 7A:
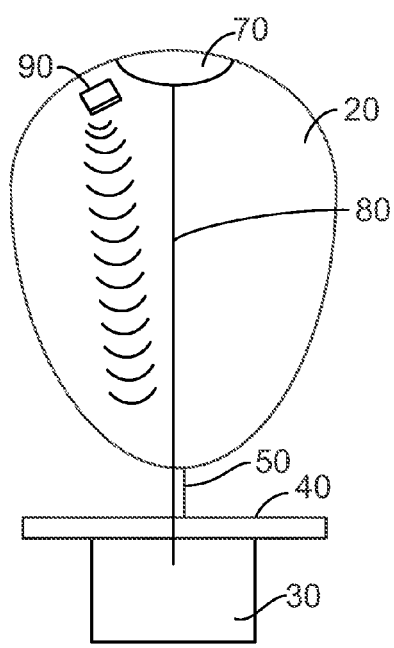
FIG. 7A shows an expanded balloon positioned above payload with a flat drag plate positioned therebetween, and a moveable plate atop the balloon envelope connected with a line to the payload, according to an example embodiment.
Figure 7B:
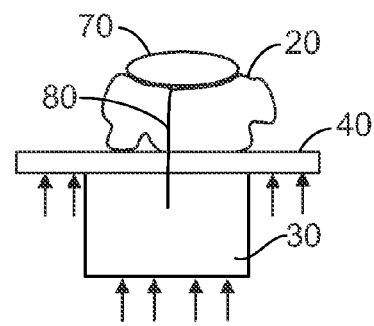
FIG. 7B shows the balloon of FIG. 7A, where the moveable plate has been moved towards the drag plate to collapse the balloon envelope, where drag forces are acting upon the payload and drag plate upon descent of the balloon, according to an example embodiment.

In FIG. 6A, the drag plate 40 is shown having outer edges that extend past a top of the payload 30 and are adjacent the side of the payload. The outer edges could also extend past a bottom of the payload 30 as well. It should also be understand that the drag plate 40 could also have other geometries, including a flat plate. In fact, FIGS. 7A and 7B show drag plate 40 as a flat plate. Drag plate 40 and/or payload 30 may be tethered to balloon envelope via cord 50. Alternately, the drag plate 40 could be attached to the balloon envelope directly as shown in FIG. 5A.

FIG. 7B shows balloon envelope 20 after it has been deflated. The drag plate 40 has a surface area that creates a drag force as the payload 30 descends towards the earth and is forced through the air in the atmosphere. The larger the surface of the drag plate 40 facing the earth, the larger the drag forces that are created slowing the descent of the payload 30. In FIG. 7B, the deflated balloon envelope 20 is shown remaining positioned between drag plate 40 and moveable plate 70. Thus, the balloon envelope 20 remains attached to the payload 30 as the payload 30 returns to the earth's surface, thereby eliminating the problems noted above associated with an uncontrolled, drifting balloon envelope.

Viewed from the top, the drag plate 40 shown in FIGS. 5-7 may also have a number of different geometries, including square, round, polygonal, etc. For example, FIG. 9A shows drag plate 40 as a circular plate whereas FIG. 9B shows drag plate 40 as a square plate. As shown in FIGS. 9A and 9B, the drag plate 40 may include an aperture 42, such that a line 80 attached to the moveable plate 70 may be pulled through the aperture 42 in the drag plate 40 towards the payload 30 to cause the balloon envelope 20 to be collapsed between the moveable plate 70 and the drag plate 40 (See FIGS. 5-7). Thus, the line 80 may be tethered to the moveable plate 70 and extend into the payload 30. In some embodiments the drag plate 40 may be attached to the bottom portion of the balloon envelope 20 and the payload 30 suspended from the line 80 that passes through the drag plate 40.

FIG. 10 shows a method 1200 that is provided that includes the step 1202 of operating a control system for a balloon comprised of a balloon envelope having a top portion and a bottom portion positioned beneath the top portion, a payload positioned beneath the balloon envelope, a moveable plate positioned atop the balloon envelope, and a line attached to the moveable plate to cause the moveable plate positioned atop the balloon envelope to be pulled towards the bottom portion of the balloon envelope. The method 1200 further includes the step 1204 of causing the top of the balloon envelope to be moved towards the bottom portion of the balloon envelope forcing gas out of the balloon envelope to collapse the balloon envelope. In addition, the method 1200 further includes the step 1206 of maintaining the collapsed balloon envelope beneath the moveable plate during balloon descent.

5. Providing a Drag Plate Positioned Above a Balloon Envelope, with a Line Attached from the Drag Plate to a Payload that May be Pulled to Draw the Drag Plate and Payload Together, with a Collapsed Balloon Envelope Between the Drag Plate and the Payload.

Figure 8A:
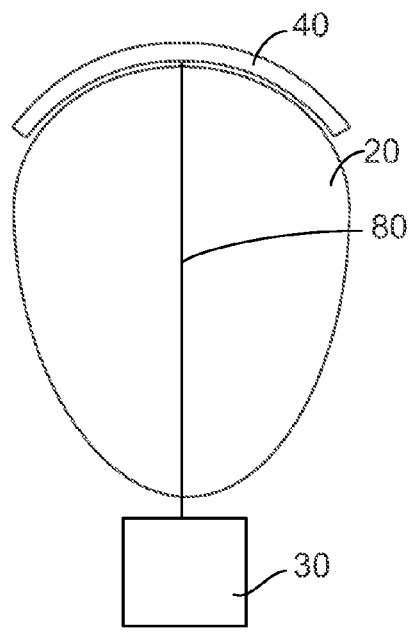
FIG. 8A shows an expanded balloon positioned below a drag plate, where the drag plate is connected with a line to the payload, according to an example embodiment.
Figure 8B:
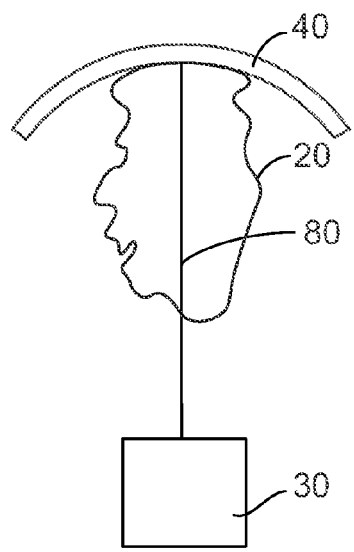
FIG. 8B shows the balloon of FIG. 8A, where the balloon envelope is shown in a collapsed state, and the payload is suspended beneath the drag plate.
Figure 8C:
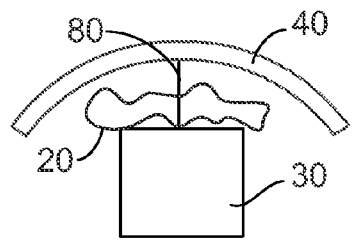
FIG. 8C shows the balloon of FIGS. 8A and 8B, where the payload has been drawn towards the drag plate, with the collapsed balloon envelope positioned between the drag plate and the payload.

As shown in FIGS. 8A-8C, example embodiments may be directed to a balloon having a balloon envelope 20 with a drag plate 40 positioned above the balloon envelope 20. As shown in FIG. 8A, the drag plate 40 may be attached by a line 80 to the payload 30 that is positioned beneath the balloon envelope 20.

FIG. 8B shows balloon envelope 20 after it has been deflated. In this embodiment, the payload 30 may be suspended from the drag plate 40 as it descends. The drag plate 40 has a surface area that creates a drag force as the payload 30 descends towards the earth and is forced through the air in the atmosphere. The larger the surface of the drag plate 40 facing the earth, the larger the drag forces that are created slowing the descent of the payload. In this example the drag plate 40 is concave with a downward facing surface, although the drag plate could also have an upward facing concave surface or a flat surface, or another desired geometry.

FIG. 8C discloses the balloon envelope of FIG. 8B, wherein the line 80 has been optionally winched towards the payload 30, or towards the drag plate 40, wherein the payload 30 and the drag plate 40 have been drawn towards one another. The drawing together of the drag plate 40 and the payload 30 may also be used to force gas out of the balloon envelope 20 to collapse the balloon envelope 20.

In the embodiments shown in FIGS. 8A-8C, the collapsed balloon envelope 20 remains positioned between drag plate 40 and the payload 30, so that the balloon envelope 20 returns to the earth's surface along with the payload 30. Because the balloon envelope 20 remains with the payload 30, the problems noted above with an uncontrolled, drifting balloon envelope are avoided.

6. A Non-Transitory Computer Readable Medium with Instructions to Cause a Moveable Plate Positioned Atop the Balloon Envelope to be Pulled Towards the Bottom of the Balloon Envelope to Force Gas Out of the Balloon Envelope to Collapse the Balloon Envelope Some or all of the functions described above and illustrated in FIGS. 5-8B may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a computing device, such as the processor 312 illustrated in FIG. 3. Alternatively, the computing device that executes the stored instructions could be another computing device, such as a server in a server network, or a ground-based station.

The non-transitory computer readable medium may store instructions executable by the processor 312 to perform various functions. The functions could include operating a control system for a balloon comprised of a balloon envelope, a payload positioned beneath the balloon envelope, a moveable plate positioned atop the balloon envelope, and a line attached to the moveable plate to cause the moveable plate positioned atop the balloon envelope to be pulled towards a bottom portion of the balloon envelope, causing the top portion of the balloon envelope to be moved towards the bottom portion of the balloon envelope forcing gas out of the balloon envelope to collapse the balloon envelope, and maintaining the collapsed balloon envelope beneath the moveable plate during balloon descent.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A balloon, comprising:
    a balloon envelope having a top portion and a bottom portion;
    a payload positioned beneath the balloon envelope;
    a moveable plate positioned over the top portion of the balloon envelope;
    a line attached to the moveable plate;
    a control system configured to cause the line to be pulled to cause the moveable plate to be pulled towards the bottom portion of the balloon envelope such that the top portion of the balloon envelope is moved towards the bottom portion of the balloon envelope forcing gas out of the balloon envelope, such that the balloon envelope is collapsed.

2. The balloon of claim 1, wherein the collapsed balloon envelope remains positioned between the moveable plate and the payload during balloon descent.

3. The balloon of claim 1, wherein the moveable plate may be held in place or released by an actuator positioned on the balloon envelope.

4. The balloon of claim 3, wherein the actuator may be controlled wirelessly via a control system that is located in the envelope itself or located in or near the payload.

5. The balloon of claim 1, further including a drag plate positioned beneath the balloon envelope, wherein the drag plate serves to slow the descent of the payload to the earth.

6. The balloon of claim 5, wherein the line is pulled through the drag plate towards the payload to cause the balloon envelope to be collapsed between the moveable plate and the drag plate.

7. The balloon of claim 5, wherein the balloon envelope is attached to the drag plate by a tether.

8. The balloon of claim 1, wherein the payload is tethered to the moveable plate by the line.

9. The balloon of claim 5, wherein the drag plate is attached to the bottom portion of the balloon envelope and the payload is suspended from the line that passes through the drag plate.

10. The balloon of claim 5, wherein an outer surface of the drag plate extends as far as the diameter of the balloon envelope when the balloon envelope is inflated.

11. The balloon of claim 10, the outer surface of the drag plate extends beyond the diameter of the balloon envelope when the balloon envelope is inflated.

12. The balloon of claim 5, wherein the drag plate comprises a downward-facing concave plate.

13. The balloon of claim 5, wherein the drag plate comprises an upward-facing concave plate.

14. A computer-implemented method, comprising:
    operating a control system for a balloon comprised of a balloon envelope having a top portion and a bottom portion positioned beneath the top portion, a payload positioned beneath the balloon envelope, a moveable plate positioned atop the balloon envelope, and a line attached to the moveable plate to cause the moveable plate positioned atop the balloon envelope to be pulled towards the bottom portion of the balloon envelope;
    causing the top of the balloon envelope to be moved towards the bottom portion of the balloon envelope forcing gas out of the balloon envelope to collapse the balloon envelope; and
    maintaining the collapsed balloon envelope beneath the moveable plate during balloon descent.

15. The method of claim 14, further including the step of using an actuator positioned on the balloon envelope to release the moveable plate to allow it to be pulled towards the bottom portion of the balloon envelope.

16. The method of claim 14, wherein the balloon further includes a drag plate positioned beneath the balloon envelope.

17. The method of claim 16, further including the step of pulling the line through the drag plate towards the payload to cause the balloon envelope to be collapsed between the moveable plate and the drag plate.

18. The method of claim 17, wherein the payload is tethered to the moveable plate by the line.

19. The method of claim 16, wherein an outer surface of the drag plate extends as far as the diameter of the balloon envelope when the balloon envelope is inflated.

20. The method of claim 19, wherein the outer surface of the drag plate extends beyond the diameter of the balloon envelope when the balloon envelope is inflated.

21. The method of claim 16, wherein the drag plate comprises a concave plate.

22. A non-transitory computer readable medium having stored therein instructions executable by a computing device to cause the computing device to perform functions comprising:
    operating a control system for a balloon comprised of a balloon envelope having a top portion and a bottom portion positioned beneath the top portion, a payload positioned beneath the balloon envelope, a moveable plate positioned atop the balloon envelope, and a line attached to the moveable plate to cause the moveable plate positioned atop the balloon envelope to be pulled towards the bottom portion of the balloon envelope;
    causing the top portion of the balloon envelope to be moved towards the bottom portion of the balloon envelope forcing gas out of the balloon envelope to collapse the balloon envelope; and
    maintaining the collapsed balloon envelope beneath the moveable plate during balloon descent.

23. The non-transitory computer readable medium of claim 22, further including the function of using an actuator positioned on the balloon envelope to release the moveable plate to allow it to be pulled towards the bottom portion of the balloon envelope.

24. The non-transitory computer readable medium of claim 22, wherein the balloon further includes a drag plate positioned beneath the balloon envelope.

25. The non-transitory computer readable medium of claim 24, further including the function of pulling the line through the drag plate towards the payload to cause the balloon envelope to be collapsed between the moveable plate and the drag plate.

26. The non-transitory computer readable medium of claim 24, wherein an outer surface of the drag plate extends as far as the diameter of the balloon envelope when the balloon envelope is inflated.

27. The non-transitory computer readable medium of claim 26, wherein the outer surface of the drag plate extends beyond the diameter of the balloon envelope when the balloon envelope is inflated.

* * * * *